J. J. STAWARTZ.
AUTOMOBILE BRAKE.
APPLICATION FILED JULY 20, 1909.
960,426.
Patented June 7, 1910.
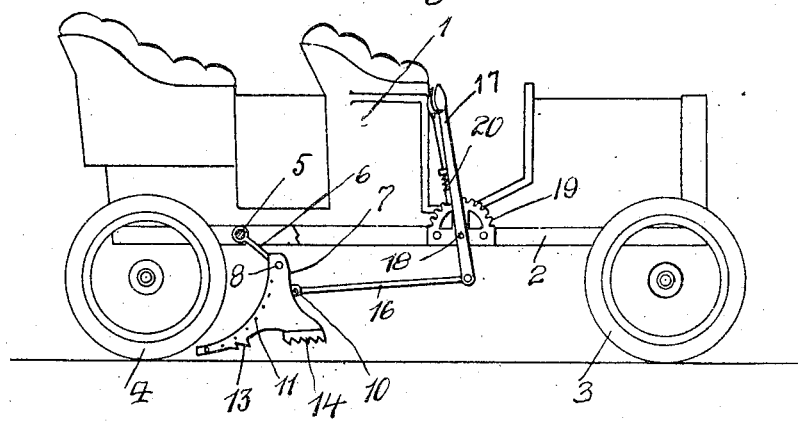
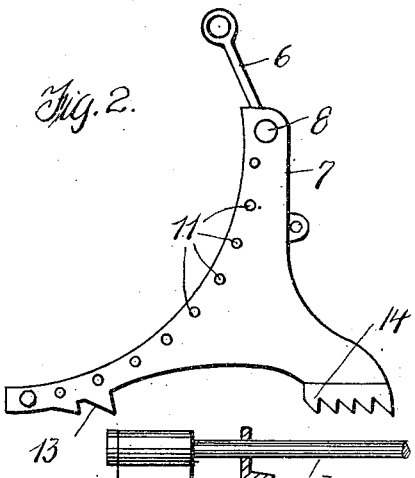
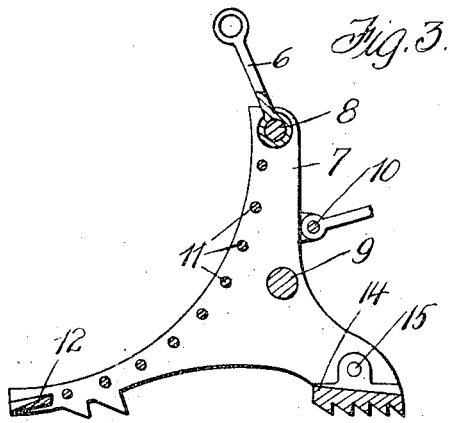
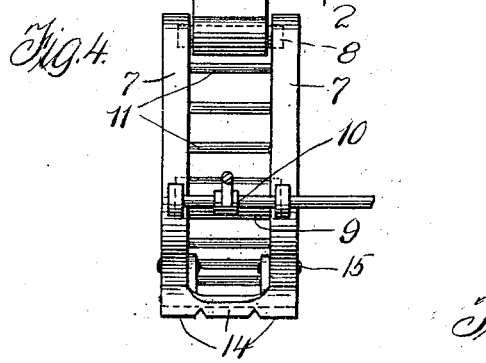
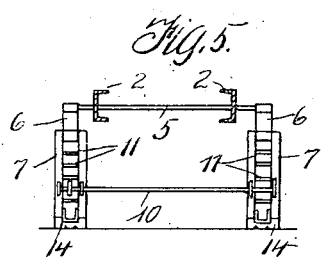
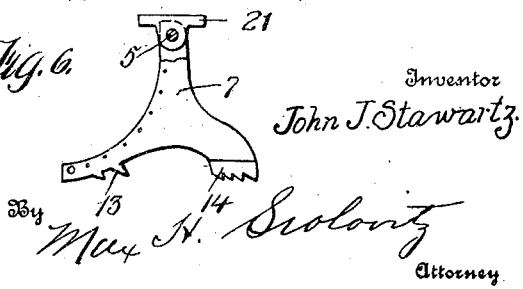
Witnesses
Samuel Payne
M. Bayan
Inventor
John J. Stawartz.
By Max H. Srolovitz
Attorney

UNITED STATES PATENT OFFICE.

JOHN J. STAWARTZ, OF HOMESTEAD, PENNSYLVANIA, ASSIGNOR, BY DIRECT AND MESNE ASSIGNMENTS, OF ONE-THIRD TO JAMES J. McCAGUE AND ONE-THIRD TO JOHN UHRIN, OF HOMESTEAD, PENNSYLVANIA.

AUTOMOBILE-BRAKE.

960,426.      Specification of Letters Patent.      Patented June 7, 1910.

Application filed July 20, 1909. Serial No. 508,630.

*To all whom it may concern:*

Be it known that I, JOHN J. STAWARTZ, a citizen of the United States, residing at Homestead, in the county of Allegheny and State of Pennsylvania, have invented certain new and useful Improvements in Automobile-Brakes, of which the following is a specification.

This invention relates to automobile brakes, and more particularly to novel brakes that have been designed for retarding and eventually stopping motor driven vehicles, without injury to tires, wheels or other movable parts of the vehicle.

My invention aims to provide a brake that will be positive in its action, free from injury by ordinary use, and highly efficient for the purpose for which it is intended. To this end, I have designed brakes that can be advantageously used in connection with automobiles; but I would have it understood that the shoes are applicable to other vehicles where it is desired to use a brake of the type above referred to.

The invention will be hereinafter considered in detail and then claimed, and reference will now be had to the drawing forming part of this specification, wherein there is illustrated what I believe to be a practical form of my brake, but it must be understood that my improvement can be varied or changed without departing from the scope of the invention.

In the drawings:—Figure 1 is a side elevation of an automobile equipped with the brakes. Fig. 2 is an enlarged side elevation of a shoe. Fig. 3 is a vertical sectional view of the same. Fig. 4 is an end view of the shoe. Fig. 5 is a similar view of the shoes on a smaller scale, and Fig. 6 is an elevation of a modified form of shoe.

In order that my invention can be fully understood, I have shown an automobile consisting of a body 1 supported by longitudinal parallel frames 2, these frames being supported by front wheels 3 and rear wheels 4. It is in connection with the rear wheels 4 that I use my brake shoes. The frames 2 adjacent to the wheels 4 are provided with a transverse rod 5 and connected to the ends of this rod by links 6 are shoes normally supported in an elevated position, but adapted to be lowered into the path of the rear wheel 4 for chucking said wheels and causing a retardation in the movement of the automobile. Each shoe is made of strong and durable metal and comprises two triangular parallel plates 7 connected by pins 8, 9, 10, 11 and by a cross piece 12. The links 6 are connected to the pins 8, and the pins 9 and 11 are employed for stiffening and bracing the plates 7, whereby the shoes will withstand the rough usage to which they are subjected. The cross piece 12 is triangular in cross section and is adapted to be engaged under the wheel 4, partly supporting said wheel while the tire of said wheel rides into engagement with the pins 11, these pins being disposed to conform to the periphery of the wheel 4, and it is in this manner that the wheel 4 is engaged when the shoe serves functionally as a chuck. The plates 7 contiguous to the cross piece 12 are provided with the depending serrations or teeth 13 for engaging in the road or pavement over which the automobile travels, and coöperating with these teeth is a detachable toothed gripping block 14 arranged at the lower front end of each shoe and retained in position by a transverse pin 15 mounted in the plates 7. Any number of teeth can be used in connection with the blocks 14. The pin 10 is of a sufficient length to extend from one shoe upon one side of the automobile to the shoe upon the opposite side, thereby resembling a rod. Loosely connected to the pin 10 between the plate 7 of each shoe are connecting rods 16, and these rods are connected with an operating lever 17 pivoted to one of the frames 2, as at 18, said lever being held in a locked position by a conventional form of rack 19 and spring pressed pawl 20.

In Fig. 6 of the drawing I have illustrated a modification of my invention, wherein the shoes are suspended from depending bearings 21 carried by the frames 2.

In operation, it is only necessary for the operator of the car or vehicle to swing the upper end of the operating lever 17 forward to allow the shoes to drop into position in the path of the wheels 4, whereby said wheels will ride on the shoes and through the medium of the weight of the vehicle cause said shoes to frictionally engage the road or pavement over which the automobile or vehicle travels. The teeth of each shoe prevents the shoe from sliding or skidding, and the automobile can be quickly or gradually stopped at the operator's will, without injury or causing wear and tear of the movable parts of the automobile.

Having now described my invention, what I claim is:—

In an automobile brake, the combination with the supporting frames and rear wheels of an automobile, of a rod arranged in said frames adjacent to said wheels, shoes suspended from said rod in the path of said wheels, each shoe comprising two parallel triangular plates, a cross piece connecting the lower rear edges of said plates, pins connecting said plates and adapted to be engaged by said wheels, gripping blocks detachably mounted between the lower front edges of said plates, teeth carried by the lower edges of said plates adjacent to the cross pieces thereof, and means connected with said shoes for normally supporting said shoes in an elevated position, said means including connecting rods and an operating lever adapted to move said rods, said lever being carried by one of said frames, substantially as described.

In testimony whereof I affix my signature in presence of two witnesses.

JOHN J. STAWARTZ.

Witnesses:
M. BAYAN,
MAX H. SROLOVITZ.